R. L. WILCOX.
MACHINE FOR CUTTING BLANKS.
APPLICATION FILED MAY 20, 1920.

1,408,916.

Patented Mar. 7, 1922.
6 SHEETS—SHEET 1.

Fig. 1.

Inventor
Richard Lester Wilcox
By George E. Hay
Atty

UNITED STATES PATENT OFFICE.

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

MACHINE FOR CUTTING BLANKS.

1,408,916.  Specification of Letters Patent.  Patented Mar. 7, 1922.

Application filed May 20, 1920. Serial No. 382,736.

*To all whom it may concern:*

Be it known that I, RICHARD LESTER WILCOX, a citizen of the United States, residing at Waterbury, in the county of New Haven and State of Connecticut, have invented certain new and useful Improvements in Machines for Cutting Blanks, of which the following is a specification, reference being had therein to the accompanying drawings.

This invention relates to new and useful improvements in machines for cutting blanks, and more particularly to machines for operating upon the ends or sides thereof. As illustrated herein, this invention is arranged for cutting a slot in the end of a blank, known in the art as bifurcating, but is not limited in its uses to this particular character of operation.

It is the object of this invention, among other things, to provide a machine for operating upon the ends or sides of a blank, with one or more cutters, that will be entirely automatic in its operations; will hold the blank rigidly during the operations thereof; provide means such as saws for the cutting operations, and so mount the same in relation to the blank while being held, that they may operate at any angle within a limited range to the axis of the blank; provide means whereby the various cuts may be either at the same or different angles in relation to the axis of the blank; provide means for adjustment of all necessary parts, and in these and many other ways to construct a machine of this character that will operate to produce a blank cut or trimmed in any desired manner or at any angle, and composed of parts of such simple design as to be economically constructed and readily assembled.

To these and other ends, my invention consists in the machine for cutting blanks, having certain details of construction and combinations of parts, as will be hereinafter described, and more particularly pointed out in the claims.

Referring to the drawings, in which like numerals of reference designate like parts in the several figures.

With this improved machine as herein illustrated blanks are fed automatically from a hopper to a feed chute and from there are transferred singly to a station where they are engaged by fingers that take them from the transfer mechanism and place them in alignment with parts which place and hold them securely in carrier mechanism by which they are successively conveyed to different stations. At these stations, a cutter (saw in this case), cuts into the ends of the blanks to produce a bifurcating slot. These saws are so mounted as to be adjustable and cut slots of the desired depth and angle for that particular station, the then finished blank is ejected and by means of a conveying chute carried into a receptacle conveniently arranged to receive it.

In the practice of my invention, I provide a body member 10 which is supported on a base 11, from one side of which projects a bracket 13 having journaled therein a shaft 14 upon which is fixed a pulley 15 and a hand wheel 16. Rotatably mounted in the body member 10 is a cam shaft 17 which is driven from the shaft 14 through the pinion 18 and bevel gear 19. Upon this cam shaft are fixed a cut-off cam 20 having secured thereto the feed cam 21, loading cam 22, dial and cutter frame cam 23 and locking cam 24, the functions of all of which will be hereinafter more particularly described.

For convenience in construction and to reduce wear upon the parts, bushings 25 and 26 are supplied to provide journals for the cam shaft, the first being in the body member 10 and the latter in the cover member 91. Rotatably mounted upon the bushing 27 in the body member 10 is the cutter frame 40 which is provided with a plurality of projecting arms 41, corresponding in number with the number of cutters designed to be used. Upon each of these arms 41 are adjustably mounted a cutter-bracket 42 which is held in its adjusted position by a bolt 43 and nut 44 threaded thereon. Pivotally connected upon each of the cutter-brackets 42 is a cutter-carrier 45. The pivotal connection for this cutter-carrier comprises a stud 46 having an eccentric portion 47 thereon and the nut 48 to hold the stud in any of its adjusted positions. A squared portion 163 on this stud provides means for rotating the stud and holding it in position while tightening the nut 48. The cutter-carrier 45 is adjusted upon its pivot mounting and held in its adjusted positions by means of a stud 164 fixed therein which projects through a slot 49 in the cutter-bracket 42 and the screws 50 which are also threaded through a slot 49 in the cutter-bracket 42 and the screws 50 which are also threaded through said cutter brackets 42, the ends of which impinge against the stud 164, as shown more particularly in Figure 3. Mounted in each of the cutter-carriers 45 is a bushing 51 which has a tapered exterior and held against relative endwise movement by a nut 52 in which is journaled the spindle 171 upon which is fixed the cutter 53 by means of a nut 54, and washer 165. The spindle 171 is held against relative endwise movement within the bushing 51 by the nuts 55.

Journaled in the cutter-frame 40 are a plurality of stud-shafts 39 corresponding in number with the cutter-carrier 45. These stud shafts are connected with the spindles 171 through a universal connection 56 which is of standard design and construction and constitutes no part of my present invention. These cutters 53 are rotated continuously by the shaft 30, having the step pulley 31 thereon, through the bevel pinion 32 which meshes into and drives a bevel pinion 33 fixed on a shaft 34, journaled in a lug 35 on the body member 10, a pinion 36 which meshes into and drives a spur gear 37 rotatably mounted on the bushing 27, and which in turn meshes into and drives a plurality of spur pinions 38, one being fixed upon each of the stud shafts 39, connections 56, and the spindles 171.

By the cutter mechanism described, its method of mounting and the means for operating the same, each of the cutters is rotated continuously, and can be adjusted so as to move in any plane, within a limited range, and at any angle within said range relatively to the axis of the cutter-frame 40. By means of the eccentric stud 46, the periphery of the cutter at its edge nearest to the axis of the cutter-frame may always be maintained in the same horizontal plane irrespective of the movement of the cutter-carrier 45. But for this eccentric pivot mounting, or its equivalent, the adjustment of the cutter-carrier 45 would slightly elevate or lower the periphery of the cutter at the point above indicated, above or below a fixed horizontal plane. This variation of position is offset by the stud 46 rotated upon its axis and thus restores the periphery of the cutter to its prior horizontal plane. The cutters are moved, as may be desired, toward or away from, the axis of the cutter-frame 40 upon the arms 41. All these adjustments require little or no skill, and the parts requiring manipulation to accomplish this result are accessible and readily actuated.

To minimize friction I provide a ball-bearing 57 of any standard construction to take the weight of the cutting-frame 40 and all of its connected parts. This ball-bearing 57 resting upon the top of the lug 58 integral with the body member 10 and in which is the bushing 27.

The dial mechanism comprises a dial shaft 29 journaled in the sub-bushings 28, within the bushing 27, a dial 59 having a plurality of radial slots 60 therein corresponding in number with the dies connected therewith and held against rotation by a dowel-pin 61, or its equivalent, fixed in a dial collar 62 on the dial shaft 29, which dowel-pin also serves as a means to hold and register with the dial a locking-plate 63, having plurality of notches 64 in its periphery corresponding in number with the said dies. Fixed to the upper side of the dial 59 are six dial-blocks 65 between which are movably mounted the slides 66, six in number. Each of these slides is provided with an adjustable binding plug 67 that is held in position against accidental movement by a lock screw 68. These adjustable plugs 67 may be provided with an angular head as is common with bolts or the like, or without a head as shown in the drawings, either these or any other form being adapted for use with my improved mechanism. In each of the slides 66 opposite to the plugs 67 is mounted a cam-roll 69 upon a stud 70 and projecting downwardly therefrom is a guide pin 71. Bridging the open space between the outer ends of the blocks 65 are the dies 72, each having a radial opening 73 therethrough with a recess 74 in its inner face and a groove 75 in its outer face. The recess 74 and groove 75 are at substantially a right angle to each other, and the axis of the openings 73 are coincident with the axis of the plugs 67.

I have shown one means for holding these dies in a fixed position relative to the dial, comprising a dog 76 which contacts with one of the bevel faces of the die 72, and is held within a recess 77 in the block 65 by a screw 78. The other bevel face of this die is within a recess 79 in the adjoining block 65. Radial movement, between the blocks 65 is imparted to each of the slides 66 from the loading cam 22, through a slide 80 carrying a cam-roll 81 and provided with a curved groove 82 in its upper surface near its inner end, and having an opening 83 therethrough. The width of this curved groove 82 corresponds with the diameter of the guide pin 71 which enters said groove during the rotation of the dial, and is moved therewith toward and away from the axis of the said dial through the action of the cam 22. Fixed in the loading slide 80 (see Fig. 3) is a stripper block 85 carrying a knockout-pin 86, the axis of which is coincident with that of the stops 67 when the same are in the loading and unloading position. A spring 84 connected at one end to a fixed part, and at the other end to said stripper block exerts its tension so as to maintain the cam-roll 81 in contact with the loading-cam 22. While I have shown and described spring means for moving the slide 80 in one direction, it is apparent that within my invention, I may actuate this slide by positive means in both directions.

The upper end of the shaft 29 is journaled in a bushing 87 fixed in a bearing bracket 88 that is supported at one end and held against movement by a rod 89, projecting from a lug 90 upon the cover-plate 91, the nuts 92 forming a convenient means for adjusting this bracket and holding it in adjusted positions. The opposite end of said bracket is supported by a rock shaft 93 journaled therein at one end, and the other end journaled in the lug 94. Mounted on the bushing 87 underneath the bearing bracket 88 and held against movement by a dowel-pin 95, or other convenient means, is a fixed cam 96 having a concentric exterior except at one point of its periphery, which is there provided with a radial recess 97, this recess being substantially the same width as the slides 66. As the dial rotates the guide pins 71 in one of the slides 66 enter the curved grooves 83 in the loading slide 80, and when the dial comes to rest, or approximately so, the loading slide 80 is actuated in a radial path toward the axis of the shaft 29, and the slide 66 enters the recess 97 in the fixed cam 96. At that time the knockout pin 86 enters the opening 73 in the die 72, and ejects therefrom the blank, now completed, which drops through the slot 60 in the dial 59, the opening 83 in the slide 80 and falls into the tube 98 which is bent so as to have its discharge end at a most convenient place for the reception of the finished article. This relative position of the dial mechanism and the slides 66 is known as the loading and unloading position, the means of unloading having been just described and the means for loading to be hereafter described.

When loading the slide 80 is again manipulated and the slide 66 moved to its outermost position, at which time it is out of the recess 97. At the next rotary movement of the dial, the cam roll 69 rides against the periphery of the fixed cam 96 and prevents a relative movement of the said slide until it is again in register with the recess 97. The cutter-frame 40, and the dial mechanism are actuated from a single cam, the dial and cutter-frame cam 23. The mechanism by which this is accomplished comprises a yoke arm 172 which is pivotally connected at one end to a lug 99 upon the carrier-frame 40 by the stud 100, and slotted at its opposite end to receive a slide block 101, mounted upon the cam-shaft 17, and having a cam-roll 102 fixed therein that rides in the groove 103 in one face of the cam 23. Journaled in the bushings 162 in the bearing lug 104 on said carrier-frame 40, is a rock shaft 105 having a rock arm 106 fixed thereon and provided with a slot 107 therethrough within which moves the roll 108 upon a stud 109 fixed in the said lug 99. Secured to the dial shaft 29 is a ratchet 110 having six teeth therein, the same corresponding in number with the aforesaid dies 72. Rotatably mounted upon the hub of the ratchet 110 is the pawl-carrier 111 having a pawl 112 pivotally mounted thereon, which is held against the ratchet 110 by the spring 113. A washer 114 held in place by nuts 115 prevents relative endwise movement of the ratchet and pawl-carrier upon the shaft 29. Rotatably mounted in the pawl-carrier 111 is a swivel block 116 through an opening through which projects the connection rod 117 that is secured to a swivel block 118 connected to a rock arm 119 secured to the rock shaft 105. Fixed to one side of the connection rod 117 is a trip member 120 having a lip 121 at its outer end which enters a recess 122 in a swivel block 116. The only rigid connection between the swivel blocks 118 and 116 is the trip member 120 which is made of spring material, and the lip 121 thereon fits into the notch 122 with sufficient pressure to operate the pawl-carrier 111 and the pawl mechanism through the pawl 112 when all of the parts are operating normally, but if this condition should not prevail, or a blank should clog the mechanism, or for any other reason the parts do not operate as designed, the lip 121 will be thrown out of the notch 122 and the rock arm 119 can continue its rocking movement without imparting movement to the dial mechanism, the connection rod 117 sliding idly in the swivel block 106.

It will be noted that the distance between the center of the shaft 29 and the stud 100 is very much greater than that between the center of said stud 100 and stud 109 so that the extent of movement of the rock arm 119 through which the dial mechanism is actuated is relatively considerable less than that of the cutter-frame 40.

As the required arc of the circle through which the spindle 171 travels about the axis of the dial shaft 29 is less than is required of the dial mechanism, an accelerated movement relative to the cutter-frame 40, is imparted to the dial mechanism by the means just described.

In its unloading and loading position the dial is locked by a dog 123 which enters the notches 64 in the locking plate 63 under the impulse of the spring 124 which surrounds the shank of said dog that is movably mounted in the bracket 125 fixed to the body member 10. This dog is moved outwardly against the tension of spring 124 by the locking cam 24 which is preferably fixed to one side of the dial and cutter frame cam 23 (see Fig. 3) and actuates the rock lever 126 having a cam-roll 127 thereon and pivotally connected with the body 10 by the stud 128 and having ears 129 which straddle the shank of the dog and abut against the nuts 130 threaded thereon. The locking cam 24 through the rock lever 126 holds the locking dog 123 out of the path of movement of the locking plate 63 during the rotation thereof, but as soon as the dial comes to rest at its loading and unloading position, the spring 124 moves the locking dog inwardly as above described. After the dial has been unloaded and then loaded again, the locking cam 24 withdraws the locking dog 123 from its engagement with the locking plate 63, and the dial mechanism is free for further rotation.

As illustrated herein, my invention is designed for operating upon a blank such as a rivet, screw, bolt, or the like, and particularly to cut a slot in the end thereof, which is generally known in the art as bifurcating. My invention, however, is not limited to such use or purpose and is only so illustrated for the purpose of showing the embodiment of one of its forms.

The blanks are preferably fed to the mechanism above described from a hopper device of any convenient or approved form with any means of operation, as this constitutes no part of my present invention.

Figure 1:
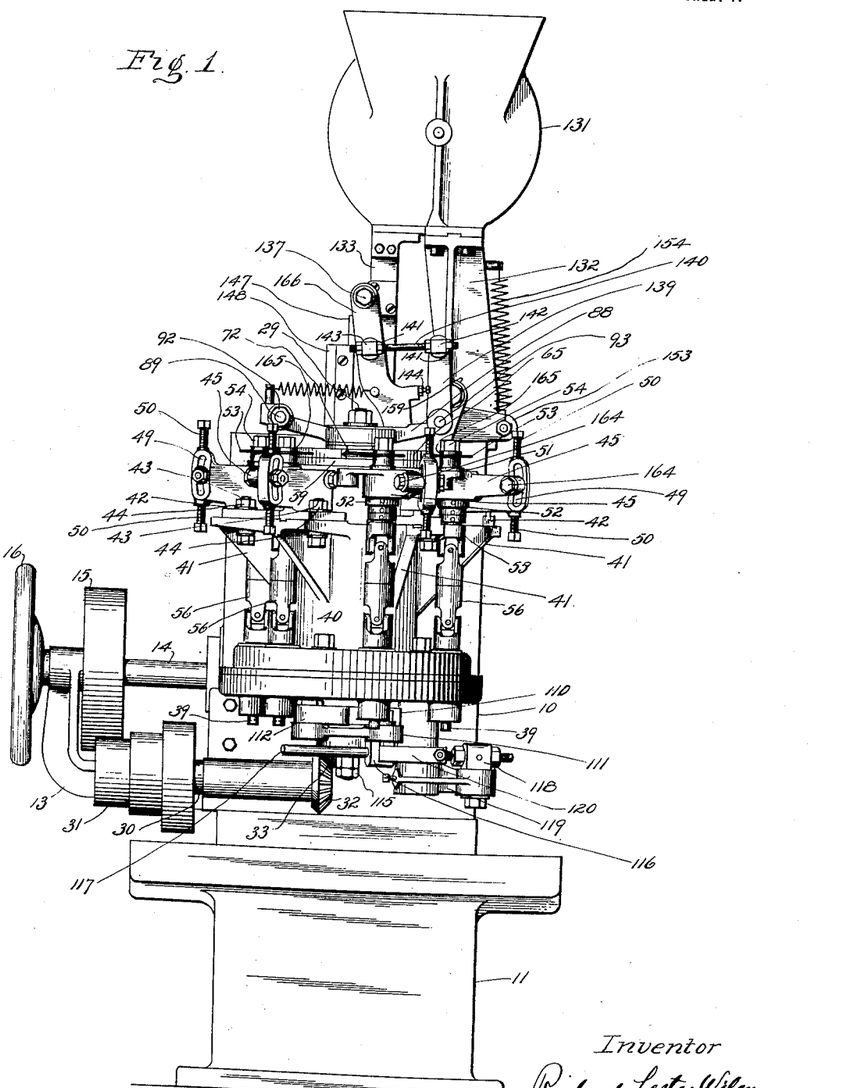
Figure 1 is a front elevation of my improved mechanism.
Figure 2:
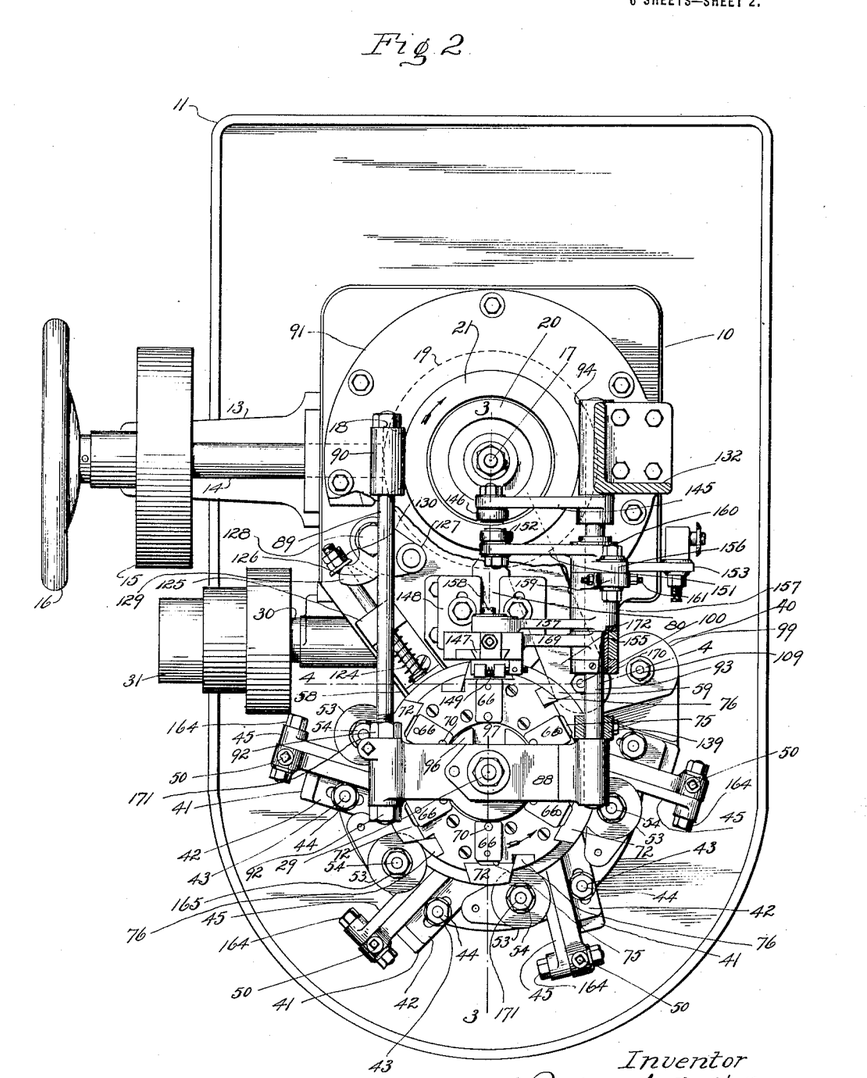
Figure 2 is a fragmentary plan view thereof.
Figures 3, 10:
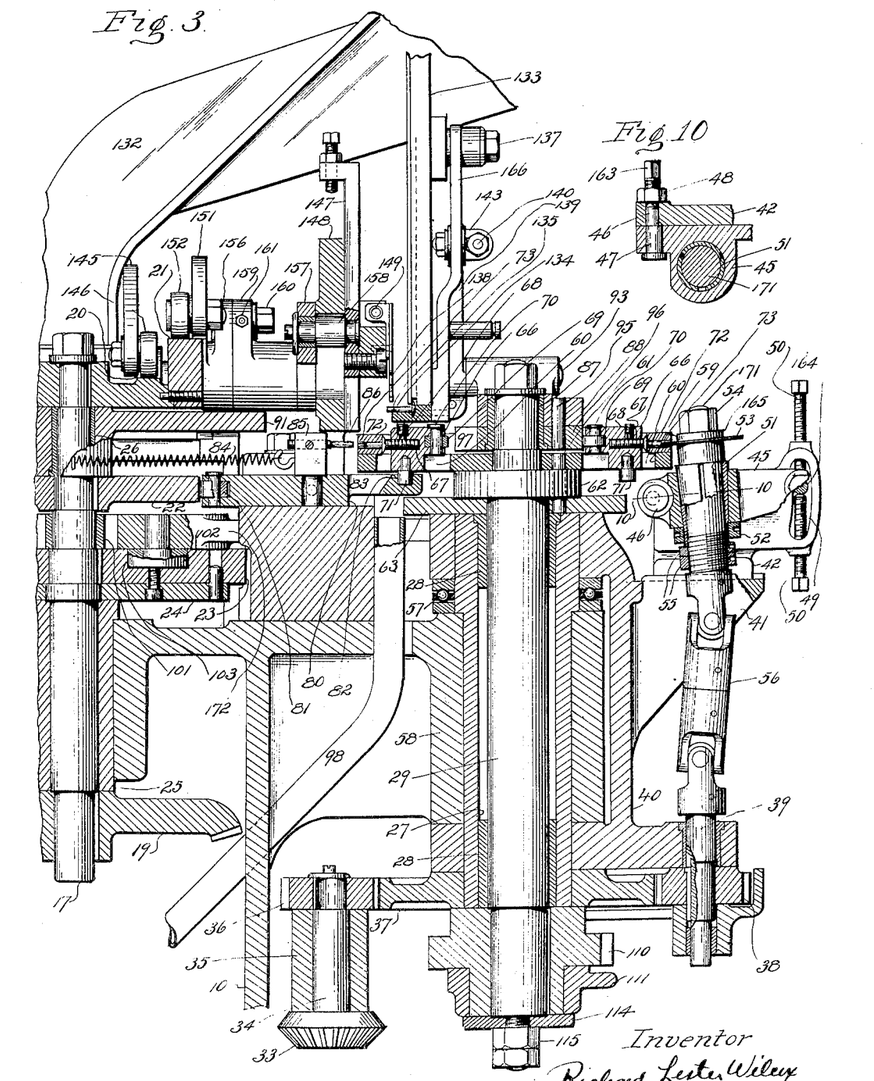
Figure 3 is an enlarged sectional elevation of a portion of the mechanism taken generally upon line 3—3 of Figure 2.
Figure 10 is an enlarged sectional view of the cutter arm and adjacent parts taken generally upon line 10—10 of Figure 3.

As shown herein, the numerals 131 designate one form of such hopper device which is supported upon a standard 132 adjustably mounted upon the body 10 and from which leads a chute 133. A blank 134 is shown in Fig. 3, at the bottom of this chute and resting in a slot 135 in the top of the tray 136 fixed to the transfer arm 166 which is pivotally mounted upon the stud 137 in the chute 133 or other fixed part. This transfer arm 166 is given an oscillating movement from the rock shaft 93, to carry the blanks from the chute 133 into line with the transfer fingers 138, through the rock arm 139 fixed thereto and the connection rod 140. This rod is adjustably connected by nuts 141 near each end with a swivel block 142 on the rock arm 139 and similarly connected with the swivel block 143, on the transfer arm 166. By means of the adjustable stop 144 in the transfer arm 166 the movement of the said arm can be so varied as to insure the registering of the notch 135 with the fingers 138. Motion is imparted to the rock shaft 93 from the cut-off cam 20 through the rock arm 145, having a roll 146 mounted thereon which rides against the face of the cam 20. The transfer fingers 138, two in number, are pivotally mounted on a slide 147 that has reciprocatory movement in a bracket 148 adjustably secured to the body 10. The spring 149 between the upper ends of these fingers tends to move the lower ends of the finger toward each other, so as to provide a grip upon the blank 134. A reciprocatory movement is imparted to the slide 147 and the finger 138 connected therewith from the feed cam 21 through the rock arm 151 having a roll 152 thereon, and connected therewith, preferably integrally, is a spring arm 153 with which is connected a spring 154 designed to hold the said cam-roll 152 in contact with the cam 21. This rock arm 151 is secured to a sleeve 155 rotatably upon the rock shaft 93 and is provided with a radial arm 156. Also mounted upon the sleeve 155 is a feed arm 157 connected at its outer end by stud 158 with the feed slide 147, so that the movement of the rock arm 151 is transmitted through the above mechanism to the feed slide 147.

Upon the hub of the feed arm 157 is a lug 159 that is connected with the radial arm 156 by the stud 160 having a nut thereon. In the lug 159 is a slot 150 through which the stud 160 projects and the screws 161 are threaded into the lug 159, so that the ends thereof impinge against bolt 160 upon opposite sides thereof. Manipulation of the screws 161 provide means for varying the relative positions of the lugs 159 and 156 about the axis of the rock shaft 93 and through them the relative position of the transfer fingers 138. In operation, as the tray 136 is in its outermost position, the lowermost blank in the column of blanks in the chute 133 drops into notch 135 therein, and is then moved therefrom into line with the transfer fingers 138.

Figures 4, 5:
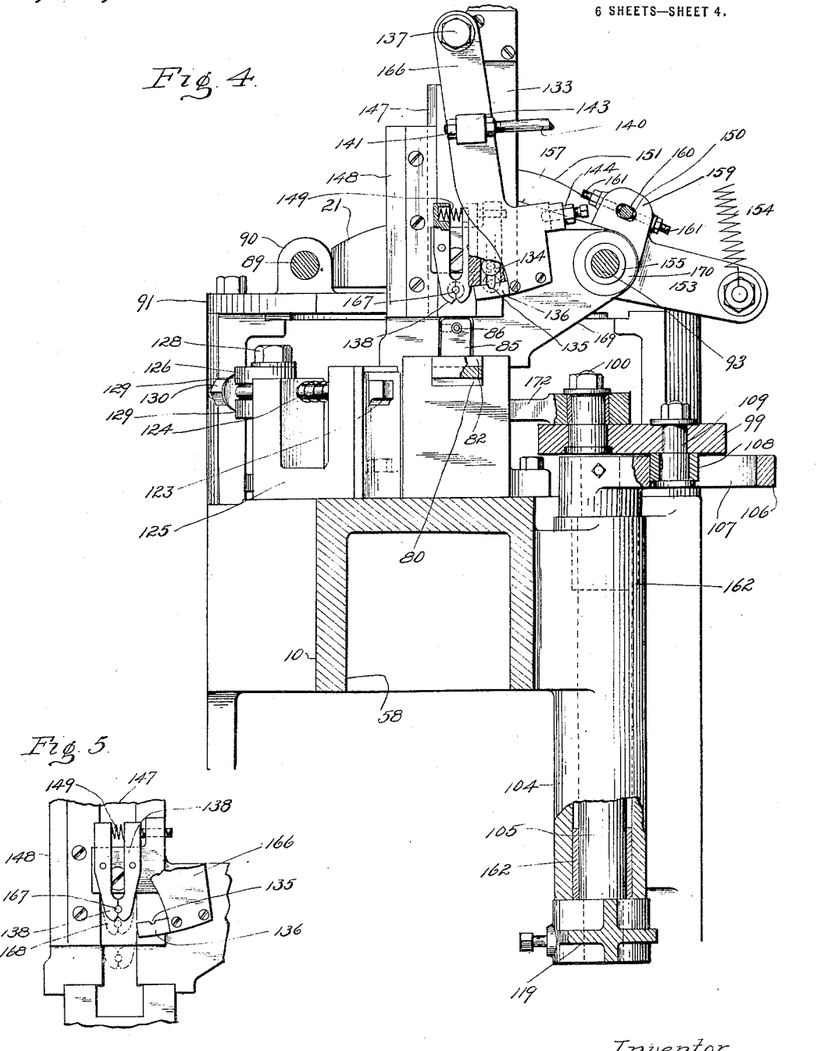
Figure 4 is a similar enlarged sectional elevation taken generally upon line 4—4 of Figure 2.
Figure 5 is a detailed elevation of the transfer fingers, and a fragmentary elevation of some of the adjacent parts.
Figure 6:
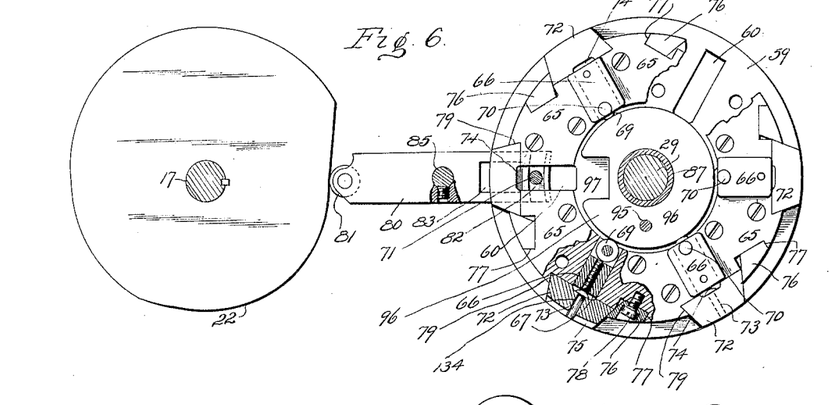
Figure 6 is a fragmentary detail plan view of a portion of the dial mechanism and some of the adjacent parts.
Figures 7, 9:
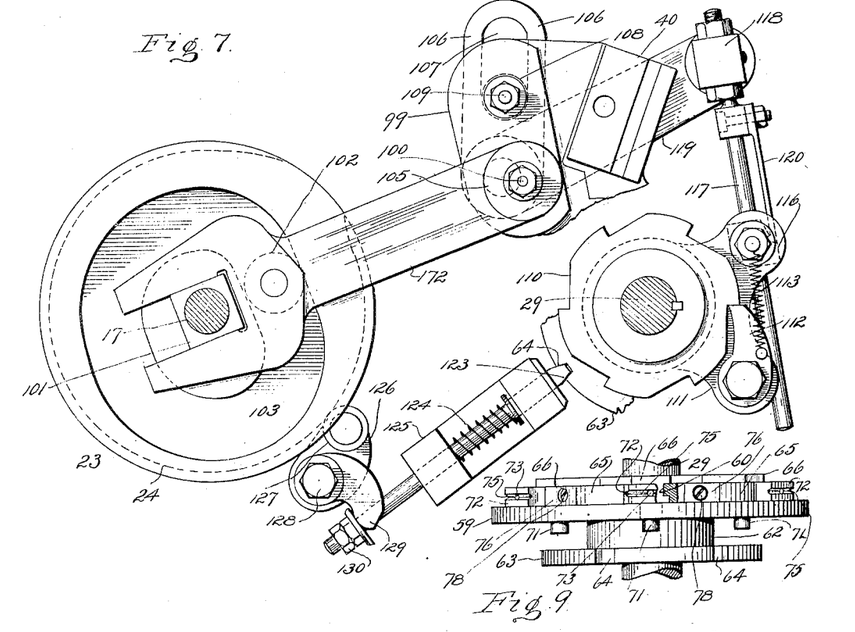
Figure 7 is a fragmentary plan view of a portion of the dial operating mechanism with the pawl in engagement with the ratchet at the completion of its stroke.
Figure 9 is a fragmentary side elevation of the dial and some of the connected parts.
Figure 8:
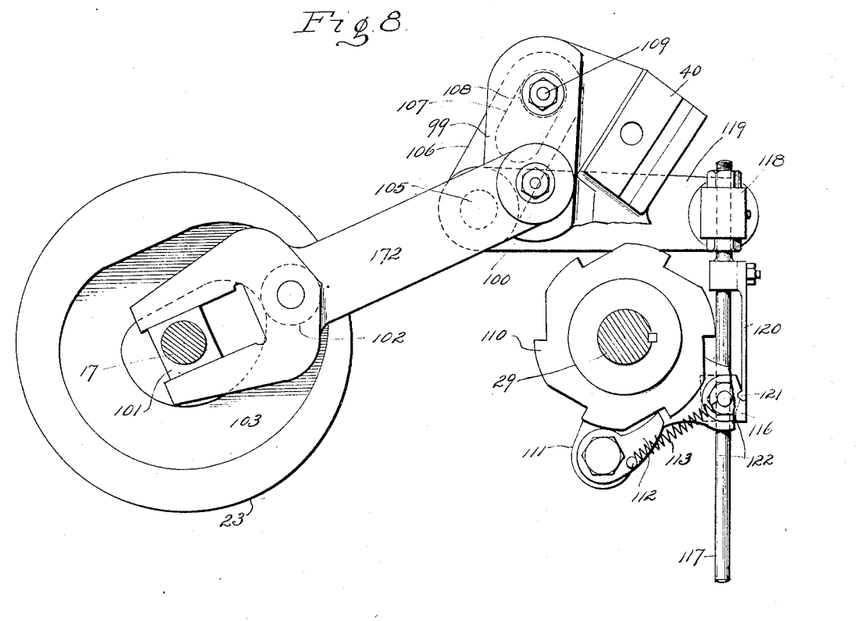
Figure 8 is a similar view with the parts in their relative positions as the pawl has returned to begin another stroke.
Figures 11, 12:
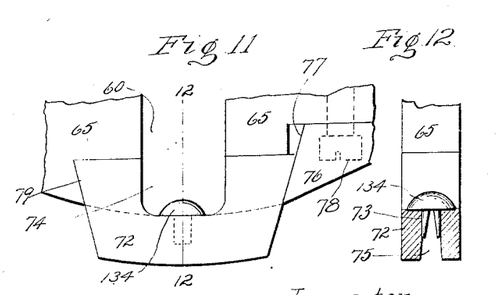
Figure 11 is a plan view of a die designed for a blank with a short shank.
Figure 12 is a transverse section thereof taken upon line 12—12 of Figure 11.

The transfer fingers now move toward the tray 136 from their full line position in Figure 5, and are moved outwardly against the tension of the spring 149 when they engage the shank of the blank 134 and snap together again with the blank held in the recesses 167 near the ends of said fingers. This position of the transfer fingers is shown by broken line 168 in Figure 5. The transfer fingers now move upwardly to their full line position in Figure 5 and lift the blank 134 out of the tray 136 which is now returned to a position to receive another blank. The transfer fingers move downwardly again and carry the blank 134 so that the axis thereof is in line with the axis of the opening 73 in the die 72, move in the loading and unloading position, and in front of the stop 67. At this time the slide 66 is within the recess 97 in the fixed cam 96. While being held by the transfer fingers in this position the slides 66 are moved outwardly and the stop 67 engages the head of the blank and push the shank thereof into the opening 73 in the die 72 until the underside of the head engages the inner face of the die. While the blank is being thus moved into the opening 73 the transfer fingers are withdrawn and moved upwardly to their original position. The die now being loaded, the dial mechanism is moved about its axis and the roll 69 on the slide 66 contacts with the periphery of the cam 96 and holds the slide against movement in any direction and the blank rigidly in the die. After its first intermittent movement the blank comes to its first rest position and the unloading and loading of the next succeeding die is accomplished in the manner above described, these operations being successively continuous.

To accommodate blanks of varying lengths the transfer finger mechanism is adjustable toward and away from the dial, this being accomplished by shifting the position of the bracket 148 upon its supports, which is connected with the sleeve 155 by the journal arm 169, a collar 170 permitting endwise movement thereon.

Through the journal arm 169 movement of the bracket 148 is imparted to the sleeve 155 and its associated parts so that the feed slide parts always maintain their relative position in all of the adjusted positions of the said bracket, the width of the feed cam 21 being such that in the extremes of adjustment the cam roll 152 will still maintain its cam contact.

Figures 13, 14:
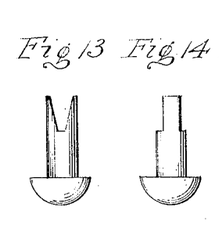
Figures 13—14 and 15 are illustrations of three forms of blanks operated upon by my improved machine.
Figure 15:
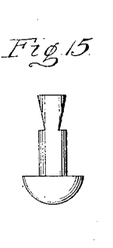

While the cutters 53 are moving through an arc of the circle by the action of the cam 23 the cutters slot that portion of the end of the blank 134 that projects into the groove 75 of the die 72. These cutting operations are continued at each of the successive stations until the blank is again brought to the unloading and loading position, when the operations upon the blank are completed and the finished blank is ejected. When the slide 66 moves into the recess 97 in the fixed cam 96, the knockout pin 86 enters the opening 73 in the die 72 and ejects the blank therefrom, which, as before mentioned passes through the openings 60 and 83 into the discharge tube 98. All of the operations in this machine are entirely automatic and the cut in the end of the blank may be either straight or with angular sides as shown in Figures 13-14 and 15. These cuts being determined by the position of the cutter in relation to the axis of the blank, which positions are determinable by the adjustment of the positions of the cutters. There being a plurality of cutters, it is obvious that the depth of cut required by each cutter and the consequent strain upon the blank is very much limited and reduced over that type of mechanism, wherein the cut is made with a single cutter.

The details of this invention may be very materially altered within the spirit of my invention, and I would therefore have it understood that I do not limit myself to the exact construction herein shown and described, but claim all such modifications, alterations, additions and changes therein as come within the scope of the appended claims.

1. In a machine for operating upon blanks, the combination with a carrier; of a support connected therewith upon the outer edge thereof; transfer mechanism for presenting a blank to the inner side of said support in timed relation to the movement thereof; independent means for moving said blank into said support from said transfer mechanism; and means for rigidly holding said blank in said support.

2. In a machine for operating upon blanks, the combination with a plurality of cutters arranged to operate at different stations; of means for presenting blanks successively to said cutters whereby they will in sequence produce one or more cut faces on said blank, and means for varying the relative angle of said cutters in relation to the length of the blank.

3. In a machine for operating upon blanks, the combination with a rotary member; of means for holding a blank therein, with its outer end projecting away from the center of the said rotary member; means for imparting an intermittent movement to said rotary member; means for actuating said holding means when in a predetermined position whereby the blanks may be released from said rotary member; and means for ejecting said blanks from said rotary member, said means moving said blank toward the center of said rotary member, the means for releasing the blank holding means and ejecting the blank operating at substantially one and the same time.

4. In a machine for operating upon blanks, the combination with a rotary member; of means for holding a blank therein, with the outer end projecting away from the center of said rotary member, said means being capable of accommodating blanks of various lengths, means for imparting an intermittent movement to said rotary member; and means for actuating said holding means when in a predetermined position whereby the blanks may be released from said rotary member; and means for ejecting said blanks from said rotary member, said means moving said blank toward the center of said rotary member.

5. In a machine for operating upon blanks, the combination with a movable carrier; of means for delivering blanks successively thereto; means for holding said blanks rigidly in said carrier; and means independent of said carrier, having a temporary operative engagement with said holding means, at a predetermined point of movement of said carrier for actuating said holding means so as to release its hold upon said blanks.

6. In a machine for operating upon blanks, the combination with a carrier; of means for moving the same in a rotary path; means for presenting blanks singly and successively to said carrier; means for holding the blanks rigidly therein; and means independent of said carrier and holding means engaging said holding means at a predetermined position, and actuating the same relatively to said carrier.

7. In a machine for operating upon blanks, the combination with a carrier; of means for moving the same in a rotary path; means for presenting blanks singly and successively to said carrier, means for holding the blanks rigidly therein; and means independent of said carrier and holding means engaging said holding means at a predetermined position and actuating the same relatively to said carrier; and means independent of said carrier for actuating said blank holding means whereby a blank is ejected from said carrier and a new blank inserted therein.

8. In a machine for operating upon blanks, the combination with a carrier of means for moving the same in a rotary path; means for presenting blanks singly and successively to said carrier, means for holding the blanks rigidly therein; and means independent of said carrier and holding means engaging said holding means at a predetermined position and actuating the same relatively to said carrier; and means independent of said carrier for actuating said blank holding means whereby a blank is ejected from said carrier and a new blank inserted therein, said latter means being positively operated in one direction.

9. In a machine for operating upon blanks, the combination with a carrier; of means for moving the same in a rotary path; means for presenting blanks singly and successively to said carrier, means for holding the blanks rigidly therein; and means independent of said carrier and holding means engaging said holding means at a predetermined position and actuating the same relatively to said carrier; and means independent of said carrier for actuating said blank holding means whereby a blank is ejected from said carrier and a new blank inserted therein, said latter means being positively operated in one direction, said mechanism comprising a movably mounted member having a make and break connection with said holding means, and a knock-out device connected therewith.

10. In a machine for operating upon blanks, the combination with a carrier; of a holder connected therewith; means for delivering blanks to said carrier, means having a movement independent of said carrier and holder but a positive engagement therewith at one point in the movement of said carrier, for imparting relative movement to said holder toward and away from the outer edge of said carrier, and during said movement ejecting a blank from said carrier and inserting a new one therein.

11. In a machine for operating upon blanks, the combination with a carrier; of a holder connected therewith; means for delivering blanks to said carrier, means having a movement independent of said carrier and holder but a positive engagement therewith at one point in the movement of said carrier, for imparting relative movement to said holder toward and away from the outer edge of said carrier, and during said movement ejecting a blank from said carrier and inserting a new one therein, and means for locking said holder in its holding position except when engaged by the aforesaid means having movement independent of said carrier.

12. In a machine for operating upon blanks, the combination with a carrier; of a holder connected therewith; means for delivering blanks to said carrier, means having a movement independent of said carrier and holder but a positive engagement therewith at one point in the movement of said carrier, for imparting relative movement to said holder toward and away from the outer edge of said carrier, and during said movement ejecting a blank from said carrier and inserting a new one therein, and fixed means for locking said holder in its holding position except when engaged by the aforesaid means having movement independent of said carrier.

13. In a machine for operating upon blanks, the combination with a movable dial; of a cam fixed in relation thereto; a holder movable with said dial and having relative movement thereon toward and away from the edge thereof, said holder having an operative engagement with said cam, that is maintained except at a predetermined position in the movement of said dial.

14. In a machine for operating upon blanks, the combination with a movable dial; of a cam fixed in relation thereto; a holder movable with said dial and having relative movement thereon toward and away from the edge thereof, said holder having an operative engagement with said cam, that is maintained except at a predetermined position in the movement of said dial; and means at this predetermined position for moving said holder relatively to said carrier.

15. In a machine for operating upon blanks, the combination with a carrier; of means for holding a plurality of blanks therein; means for imparting an intermittent movement to said carrier; a plurality of cutters; means for actuating said carrier whereby the blanks will be engaged by said cutters at each rest position between said intermittent movements; means engaging one of said holders at the approximate end of each intermittent movement, maintaining its engagement during the rest position, and continuing it during the first portion of the next succeeding intermittent movement, all for the purpose of independently actuating said holder relatively to said carrier.

16. In a machine for operating upon blanks, the combination with a carrier; of a support connected therewith and having an opening therethrough from the front to rear and a slot in the front edge, parallel to its length, and at substantially a right angle to said opening and a holder movable with the carrier and having a constant contact with the blank during the rotation of the carrier except when the blank is being ejected and a new blank inserted.

17. In a machine for operating upon blanks, the combination with means for automatically presenting blanks to and holding them rigidly at a plurality of operating stations a cutter at each of these stations, and means for varying the relative position of each of said cutters whereby the cut made by each of said cutters will combine to produce a single slot or cut surface upon said blank.

18. In a machine for operating upon blanks, the combination with means for automatically presenting blanks to and holding them rigidly at a plurality of operating stations; of a cutter at each of these stations taking an independent cut upon said blanks, and means for varying the relative position of said cutter in relation to the length of said blank.

19. In a machine for operating upon blanks, the combination with means for automatically presenting blanks to and holding them rigidly at a plurality of operating stations; of a cutter at each of these stations taking an independent cut upon said blanks; means for varying the relative position of said cutter in relation to the length of said blank; and means for maintaining a single point of the cutting edge of said cutter in the same plane irrespective of its other adjustments.

20. In a machine for operating upon blanks, the combination with a carrier; of means for holding a plurality of blanks therein; means for imparting an intermittent movement to said carrier whereby the blanks are presented to a plurality of stations; a cutter at each of these stations; means for imparting movement thereto; and means for varying the relative position of said cutters whereby at some of said stations said cutters will operate upon one side of the longitudinal center of said blanks and at other of said stations upon the opposite side of said cutter.

21. In a machine for operating upon blanks, the combination with a means for presenting blanks successively to different stations; of a cutter at each of said stations, all of said cutters being of substantially the same size, and means for adjusting said cutters in relation to said blank whereby the same will produce, upon the completion of the cutting operations, a blank with a slot therein of a width exceeding that of said cutters.

22. In a machine for operating upon blanks, the combination with means for presenting blanks successively to different stations; of a cutter at each of said stations, all of said cutters being of substantially the same size, and means for adjusting said cutters in relation to said blank whereby the same will produce, upon the completion of the cutting operations, a blank with a slot therein of a width exceeding that of said cutters, and variable in width throughout its length.

23. In a machine for operating upon blanks, the combination with a rotary carrier; of means for holding blanks therein; means for imparting an intermittent movement to said carrier; a plurality of cutters; means for imparting a continuous rotary movement to said cutters; and means for moving all of said cutters as a unit in a path around the said carrier but independently thereof, the relative arcs through which the said carrier and cutters travel being variable.

24. In a machine for operating upon blanks, the combination with a rotary carrier; of means for holding blanks therein; means for imparting an intermittent movement to said carrier; a plurality of cutters; means for imparting a continuous rotary movement to said cutters; means for moving all of said cutters as a unit in a path around the said carrier but independently thereof, the length of the arc through which said carrier moves at each intermittent movement being greater than the arc through which the cutters move.

25. In a machine for operating upon blanks, the combination with a carrier member; of means for imparting an intermittent rotary movement thereto; means connected therewith for holding blanks therein; a plurality of cutters; a member with which said cutters are connected having an intermittent movement independently of said carrier; means for operating both said carrier member and member from the same element, said means permitting a variable length of movement of one of said members in relation to the other.

26. In a machine for operating upon blanks, the combination with a carrier; of means for holding blanks therein; a plurality of cutters; a frame within which all of such cutters are mounted, means for imparting rotary movement to said cutters; and means for imparting an intermittent rotary movement to said frame, the speed of movement of said carrier being accelerated in relation to that of said frame.

27. In a machine of the character described wherein blanks are automatically presented to and rigidly held at a plurality of operating stations by carrier mechanism, a cutter frame, a cutter for engaging said blanks at each of said stations, a shaft for each of said cutters, and a bearing adjustably connected with said carrier frame for each of said shafts.

28. In a machine of the character described wherein blanks are automatically presented to and rigidly held at a plurality of operating stations by carrier mechanism, a cutter frame, a cutter for engaging said blanks at each of said stations, a shaft for each of said cutters, a bearing adjustably connected with said carrier frame for each of said shafts, and means for rotating said cutters irrespective of their relative position with said cutter frame.

29. In a machine of the character described wherein blanks are automatically presented to and rigidly held at a plurality of operating stations by carrier mechanism, a cutter frame, a cutter for engaging said blanks at each of said stations, a shaft for each of said cutters, a bearing adjustably connected with said carrier frame for each of said shafts, and means for locking said bearing in any of its adjusted positions.

30. In a machine of the character described wherein blanks are automatically presented to and rigidly held at a plurality of operating stations by carrier mechanism, a cutter frame, a cutter for engaging said blanks at each of said stations, a shaft for each of said cutters, a bearing for each of said shafts pivotally connected with said cutter frame, each of said shafts being driven from a shaft rotatable about a fixed axis, through mechanisms that maintain its operative connection irrespective of the relative position of said pivoted bearing.

31. In a machine of the character described wherein blanks are automatically presented to and rigidly held at a plurality of operating stations by carrier mechanism, a cutter frame, a cutter for engaging said blanks at each of said stations, a shaft for each of said cutters, and a bearing pivotally connected with said carrier frame for each of said shafts, said bearing being pivoted in such manner that it will maintain a single point of the cutting edge of the cutter in the same plane during its adjustments.

32. In a machine of the character described wherein blanks are automatically presented to and rigidly held at a plurality of operating stations by carrier mechanism, a cutter frame, a cutter for engaging said blanks at each of said stations, a shaft for each of said cutters, and a bearing having an eccentric pivot connection with said carrier frame for each of said shafts.

33. In a machine of the character described wherein blanks are automatically presented to and rigidly held at a plurality of operating stations by carrier mechanism, a cutter frame, a cutter for engaging said blanks at each of said stations, a shaft for each of said cutters, a bearing for each of said shafts, an eccentric pivoted connection between each of said bearings and the cutter frame, a shaft journaled in each of said bearings, a cutter mounted thereon, means for locking said bearings in any of their adjusted positions, and means for operating each of said shafts irrespective of their relative position on said cutter frame.

34. In a machine of the character described wherein blanks are automatically presented to and rigidly held at a plurality of operating stations by carrier mechanism, a cutter frame, a cutter for engaging said blanks at each of said stations, a shaft for each of said cutters, and a bearing adjustably connected with said carrier frame for each of said shafts, whereby each of said cutters may be adjusted in a rotary path with the center of its rotation a single point in the cutting edge thereof.

35. In mechanism of the character described having as a part thereof a rotary dial, a plurality of slides mounted so as to move therein; means for maintaining said slides in their outermost position except at one point of the rotation of said dial, and means at this latter point for moving said slides inwardly.

36. In mechanism of the character described having as a part thereof a rotary dial, a plurality of slides mounted so as to move therein; means for maintaining said slides in their outermost position except at one point of the rotation of said dial, and means at this latter point for moving said slides inwardly, said means having a separable connection therewith.

37. In mechanism of the character described having as a part thereof a rotary dial, a plurality of slides mounted so as to move therein; means for maintaining said slides in their outermost position except at one point of the rotation of said dial, and means at this latter point for moving said slides inwardly, said means being cam actuated and having a separable connection with said slides.

38. In mechanism of the character described having as a part thereof a rotary dial, a plurality of slides mounted so as to move therein; means for maintaining said slides in their outermost position except at one point of the rotation of said dial, and means at this latter point for moving said slides inwardly, said means comprising an independently actuated member having a recess therein and into which one of said slides is moved when the same is brought into register therewith.

39. In mechanism of the character described having as a part thereof a rotary dial, a plurality of slides mounted so as to move therein; means for maintaining said slides in their outermost position except at one point of the rotation of said dial, and means at this latter point for moving said slides inwardly, said dial being provided with a die in its outer edge substantially opposite each of said slides.

40. In mechanism of the character described having as a part thereof a rotary dial, a plurality of slides mounted so as to move therein; means for maintaining said slides in their outermost position except at one point of the rotation of said dial, and means at this latter point for moving said slides inwardly, said dial being provided with a die in its outer edge substantially opposite each of said slides, and means for detachably securing said die to said dial.

41. In mechanism of the character described having as a part thereof a rotary dial, a plurality of slides mounted so as to move therein; means for maintaining said slides in their outermost position except at one point of the rotation of said dial, and means at this latter point for moving said slides inwardly, said dial being provided with a die in its outer edge substantially opposite each of said slides, and adjustable means connected with each of said slides for holding the blank in the die associated therewith.

42. In mechanism of the character described having as a part thereof a rotary dial, a plurality of slides mounted so as to move therein; means for maintaining said slides in their outermost position except at one point of the rotation of said dial, and means for moving each of said slides inwardly at a predetermined point in the rotation of said dial, said means comprising a reciprocatory member that has an interlocking engagement with a part upon said slide, when the same is brought into register therewith.

43. In mechanism of the character described having as a part thereof a rotary dial, a plurality of slides mounted so as to move therein; means, as a fixed member, for maintaining said slides in their outermost position except at one point of the rotation of said dial, and means at this latter point for moving said slides inwardly, each of said slides being provided with a cam roll that is held in touch with the periphery of said fixed member until said slide is brought into register with the recess therein.

44. A machine of the character described having a rotary carrier with means connected therewith for holding blanks therein, said carrier having an intermittent movement, a cutter frame having a plurality of cutters rotatably mounted therein and intermittently movable around the exterior of said rotary carrier, and means for moving said rotary carrier at each intermittent movement through a greater arc than that through which the said cutters travel, said means comprising a rotary cam, an operative connection between said cam and cutter frame, and an operative connection between said cutter frame and rotary carrier, whereby movement of the former is imparted to and accelerated in the latter.

45. A machine of the character described having a rotary carrier with means connected therewith for holding blanks therein, said carrier having an intermittent movement, a cutter frame having a plurality of cutters rotatably mounted therein and intermittently movable around the exterior of said rotary carrier, and means for moving said rotary carrier at each intermittent movement through a greater arc than that through which the said cutters travel, said means comprising a rotary shaft to which said rotary carrier is connected, a cam shaft, a cam thereon, an operative connection between said cam and said cutter frame, a rock member, connection between said cutter frame and rock member whereby movement of the latter is transmitted to the former, and a ratchet and pawl connection between said rock member and said rotary carrier.

46. A machine of the character described having a rotary carrier with means connected therewith for holding blanks therein, said carrier having an intermittent movement, a cutter frame having a plurality of cutters rotatably mounted therein and intermittently movable around the exterior of said rotary carrier, and means for moving said rotary carrier at each intermittent movement through a greater arc than that through which the said cutters travel, said means comprising a rock member having an operative engagement with said carrier frame, and a ratchet and pawl connection between said rock member and said rotary carrier.

47. A machine of the character described having a rotary carrier with means connected therewith for holding blanks therein, said carrier having an intermittent movement, a cutter frame having a plurality of cutters rotatably mounted therein and intermittently movable around the exterior of said rotary carrier, and means for moving said rotary carrier at each intermittent movement through a greater arc than that through which the said cutters travel, said means comprising a rock member having an operative engagement with said carrier frame, and a ratchet and pawl connection between said rock member and said rotary carrier that will yield if excessive strain is placed upon said dial carrier.

48. A machine of the character described having a rotary carrier with means connected therewith for holding blanks therein, said carrier having an intermittent movement, a cutter frame having a plurality of cutters rotatably mounted therein and intermittently movable around the exterior of said rotary carrier, and means for moving said rotary carrier at each intermittent movement through a greater arc than that through which the said cutters travel, said means comprising a rock arm mounted so as to move about a center different from that of said cutter frame, a part connected with said cutter frame having engagement with said rock arm, whereby movement of said cutter frame will impart movement to said rock arm, a ratchet connected with the rotary carrier, a pawl carrier, a pawl mounted upon said carrier, a connection between said rock arm and pawl carrier having a yielding engagement at one end whereby it will become disengaged and impart no movement to said pawl, if perchance the strain upon any of the parts exceeds the normal.

49. A machine of the character described having a rotary carrier with means connected therewith for holding blanks therein, said carrier having an intermittent movement, a cutter frame having a plurality of cutters rotatably mounted therein and intermittently movable around the exterior of said rotary carrier, and means for moving said rotary carrier at each intermittent movement through a greater arc than that through which the said cutters travel, said means comprising a rotary cam, an operative connection between said cam and cutter frame, and an operative connection between said cutter frame and rotary carrier, whereby movement of the former is imparted to and accelerated in the latter, means for locking said rotary carrier in its rest position, comprising a spring actuated dog that registers with notches in a locking member connected with said dial carrier, and cam actuated means for withdrawing said dog.

50. A machine of the character described having a rotary carrier, means movably connected therewith for holding a blank in said carrier, and transfer mechanism for gripping a blank and placing it in front of said holding mechanism in its retracted position with the end thereof inside of the periphery of the carrier, and means for actuating said holding means to move said blank into a support upon said carrier with the outer end thereof projecting away from the axis of rotation thereof.

In testimony whereof, I have hereunto affixed my signature.

RICHARD LESTER WILCOX.